United States Patent
Moerbe

(10) Patent No.: US 6,578,437 B1
(45) Date of Patent: Jun. 17, 2003

(54) SENSOR ARRAY FOR DETECTING ROTATION ANGLE AND/OR TORQUE

(75) Inventor: Matthias Moerbe, Ilsfeld-Helfenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,539

(22) PCT Filed: Jul. 29, 1999

(86) PCT No.: PCT/DE99/02331

§ 371 (c)(1),
(2), (4) Date: Jan. 25, 2001

(87) PCT Pub. No.: WO00/08434

PCT Pub. Date: Feb. 17, 2000

(30) Foreign Application Priority Data

Aug. 7, 1998 (DE) ......................... 198 35 694

(51) Int. Cl.[7] ................................. G01L 3/02
(52) U.S. Cl. ................................. 73/862.328
(58) Field of Search .............. 73/862.322, 862.325, 73/862.326, 862.328, 862.329

(56) References Cited

U.S. PATENT DOCUMENTS

| | | | |
|---|---|---|---|
| 4,450,729 A | | 5/1984 | Troeder |
| 4,580,649 A | * | 4/1986 | Ohe et al. ................... 180/444 |
| 4,874,053 A | * | 10/1989 | Kimura et al. ............. 180/443 |
| 5,501,110 A | | 3/1996 | Peilloud et al. |
| 5,910,001 A | * | 6/1999 | Takahashi et al. ..... 29/888.023 |
| 5,930,905 A | * | 8/1999 | Zabler et al. .................... 33/1 |

FOREIGN PATENT DOCUMENTS

| | | |
|---|---|---|
| DE | 141 202 | 4/1980 |
| DE | 195 06 938 A | 8/1996 |

* cited by examiner

*Primary Examiner*—Max Noori
(74) *Attorney, Agent, or Firm*—Michael J. Striker

(57) ABSTRACT

A sensor arrangement for detecting a rotational angle and/or a torque of rotating mechanical components has a torsion bar provided between two angle encoders, and rotatable bodies which are coupled to the angle encoders so that from a difference in rotational angles of the rotatable bodies an absolute rotational angle position of the rotating component and a torque acting on the rotating component are derived.

7 Claims, 1 Drawing Sheet

SENSOR ARRAY FOR DETECTING ROTATION ANGLE AND/OR TORQUE

BACKGROUND OF THE INVENTION

The invention relates to a sensor for detecting an angle of rotation and/or a torque, in particular at axles or shafts, and a method for performing this detection.

From U.S. Pat. No. 5,501,110, a sensor arrangement is already known in which the torque transmitted to a shaft is to be detected. The torque is determined from the torsion, or the offset in rotational angle of the shaft ends and from an elasticity constant, which depends on the material and the geometry of the shaft. Here, two magnets and one Hall sensor facing each magnet are mounted on two disks that rotate with the shaft and that are solidly coupled mechanically to the ends of the shaft.

For instance, to detect the torque acting on a steering wheel shaft of a motor vehicle during the rotation of the steering wheel, very small changes in angle must be measured in both directions of rotation of the steering wheel. In evaluating the field changes in the field originating at the magnets, the known arrangement therefore requires an extremely sensitive and also temperature-stable measurement apparatus.

The torque in the rotating steering wheel spindle is a key variable for many closed- and open-loop control tasks in the motor vehicle. For instance in such vehicle systems as electric motor power steering, adaptive cruise control, and vehicle dynamics control, it is often necessary to detect both variables, that is, the absolute rotational angle of the steering wheel and the torque at the steering spindle.

In principle, the torque can be detected in various ways considered to be known per se. The mechanical strain in the material subjected to torsion is initially the direct measurement variable for the torque, the elongation, or the compression. This mechanical strain can be measured for instance with strain gauges that are applied in the desired direction. In the case of rotating shafts, however, the problem exists of signal transmission; although depending on the application this problem can be solved with a rotation transmitter or with slip rings, nevertheless it is quite expensive and vulnerable to malfunction.

Mechanical strains can also be detected, again in a manner known per se, in contactless fashion using magnetoelastic materials. However, it is extraordinarily difficult to bring about a permanent connection technique between magnetoelastic foils and the torsion shaft. Various methods also exist of detecting a measurement angle by means of the rotational angle offset between different ends of the shaft. This measurement angle can for instance be detected by optical methods or methods based on eddy currents. The optical methods usually have the disadvantage of detecting the angle incrementally and ascertaining the angle and thus the torque from the difference in trigger times, or in other words only dynamically.

It is also known per se from German Patent Disclosure DE 195 06 938 A1 (U.S. Ser. No. 08/894,453) to perform an absolute angle measurement of a rotatable shaft by providing the shaft, whose angular position is to be ascertained with a gear wheel or a ring gear. This gear wheel or ring gear cooperates with two further gear wheels, disposed adjacent one another, whose respective angular positions are ascertained continuously with the aid of a sensor; the rotational angle of the shaft that is to be determined in the final analysis can be ascertained from the two measured angles, using a suitable calculation method.

SUMMARY OF THE INVENTION

The sensor arrangement for detecting the rotational angle and/or the torque of rotating mechanical components is advantageously provided, in accordance with the invention, with two angle encoders that are refined according to the invention, which are disposed at different points on the computer, with a torsion bar being formed between them.

In a manner known per se from DE 195 06 938 A1 (U.S. Ser. No. 08/894,453), two bodies rotating in slaved fashion locally at somewhat different speeds of revolution are disposed on the first angle encoder on the circumference of the rotating component; their rotational angles $\psi$ and $\theta$ are detectable with the sensors, and from their difference in rotational angle, the absolute rotational angle position $\phi$ of the rotating component can be derived.

According to the invention, the second angle encoder engages the other end of the torsion bar, and a locally rotating body also engages a sleeve corresponding to the first angle encoder; this rotating body is embodied in terms of its dimensions in accordance with one of the rotating bodies on the first angle encoder. From the measured difference in rotational angle of the rotatable body of the second angle encoder and the identically embodied rotatable body of the first angle encoder, the torque can now be derived at the rotating component in a simple way, since both angle encoders are displaced counter to one another by a torsion caused by the torque.

In an advantageous embodiment according to the invention, the first angle encoder is provided with angle markings or intermeshing sets of teeth on the circumference of the rotating component, in the same way as the rotating bodies. The second angle encoder is likewise provided with angle markings or intermeshing sets of teeth on the circumference of a sleeve and the rotating body. The number of teeth or angle markings on the rotating component and on the sleeve agree. The number m of teeth or angle markings on the rotating body and on one of the rotating bodies on the first angle encoder are also embodied in agreement. Especially preferably, the number m of teeth or angle markings on the two rotating bodies on the first angle encoder differ by one tooth or one angle marking.

In an advantageous method for ascertaining the rotational angle and/or the torque, a first value k1 can be ascertained with the sensor arrangement of the invention for each position of the rotating component, by evaluation of the rotational angles $\psi$ and $\theta$ of the rotatable bodies on the first angle encoder. A second value k2 can be ascertained by evaluating the rotational angle of the rotatable body on the second angle encoder. The ratio of the values k1 and k2 is monitored, and if there is a change in a ratio and in the angular difference between the respective identical rotatable bodies on the second angle encoder and on the first angle encoder or on the second angle encoder and on the first angle encoder, a torque is detected.

The sensors that detect the angular position of the rotatable bodies can be, magnetoresistive AMR, CMR or GMR sensors, which output a signal that is dependent substantially on the field line direction of the magnets connected to the rotating bodies. These sensors allow use even if installation space is slight and enable a simple electronic evaluation optionally after an analog-to-digital conversion. The evaluation circuit can be a hybrid circuit, which includes the magnetoresistive sensors and a computation circuit for evaluating the measured angles.

In a preferred embodiment, the rotating component is the steering spindle of a motor vehicle, on which spindle the angle encoders are mounted. Once again, because the set of teeth is easy to install on the steering spindle and a torsion bar is embodied with a further set of teeth, a sensor arrangement according to the invention can be produced that requires relatively little installation space. In the line end check in motor vehicle manufacture, the angle differences and the above-described values k1 and k2, as well as their ratio to one another, are detected without torque in straight-ahead driving and are stored in memory. In the ensuing monitoring of the values k1 and k2, these stored values can then be used as a reference.

These and additional characteristics of preferred refinements of the invention are disclosed not only in the claims but also in the specification and the drawings; the individual characteristics can each be realized on their own or together in the form of subsidiary combinations in the embodiment of the invention and in other fields and can represent both advantageous and separately patentable versions for which patent protection is here claimed.

BRIEF DESCRIPTION OF THE DRAWINGS

An exemplary embodiment of the sensor arrangement of the invention will be explained in conjunction with the drawing. Shown are.

DESCRIPTION OF THE PREFERRED EMBODIMENTS

Figure 1:
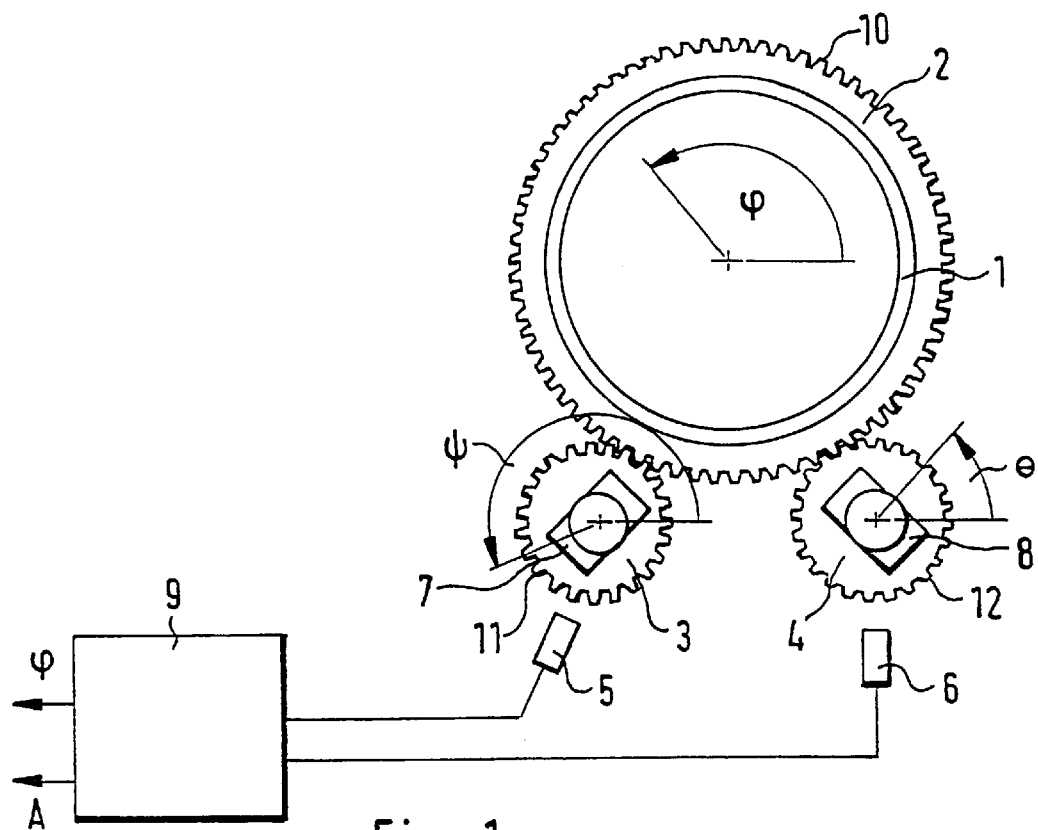
FIG. 1, a schematic view of a sensor arrangement for detecting the absolute angular position of a shaft in the prior art.

In FIG. 1, in a schematic view, a shaft 1 is shown as a rotating component, whose rotational angle $\phi$ is to be determined, in a manner known per se from the background section of DE 195 06 938 A1 (U.S. Ser. No. 08/894,453). A set of teeth 2 with a number n of teeth is mounted on the circumference of the shaft 1. Meshing with the set of teeth 2 are the teeth of a gear wheel 3 and a gear wheel 4, as further rotatable bodies. The gear wheel 3 in this example has a number m of teeth, and the gear wheel 4 has a number m+1 of teeth. In the case of the gear wheel 3, a rotational angle $\psi$ is measured, and in the case of the gear wheel 4, a rotational angle $\theta$ is measured.

The measurement of these rotational angles $\psi$ and $\theta$ is done in contactless fashion here, by means of what are known as magnetoresistive sensors 5 and 6, by a detection of the magnetic field courses that are engendered by magnets 7 and 8 on the gear wheels 3 and 4. The sensors 5 and 6 are connected to an electronic evaluation circuit 9, in which the calculation steps required to determine the rotational angle $\phi$ and known per se from the prior art cited take place.

To calculate the absolute angular position of the shaft 1, the sensors 5 and 6 are embodied as absolute sensors; that is, immediately after the arrangement is put into operation, the existing rotational angle of the gear wheels 3 and 4 are known. On the basis of these angles, the instantaneous rotational angle $\phi$ of the shaft 1 can be determined immediately, as long as the number of teeth 10 of the set of the teeth 2 on the shaft 1 and the number of teeth 11 on the gear wheel 3 and of teeth 12 on the gear wheel 4 are known. Depending on the size of the angle $\phi$ to be detected, the number of teeth 10, 11 and 12 can be selected accordingly.

For an absolute angle detection range of $\phi=3600°$ and a measurement range $\Omega$ of the two sensors 5 and 6 of 360° and a requisite precision of 1°, the number of teeth of the set of teeth 2 must be n=87, in that case, the number of teeth m must be m=29. With this kind of toothing, an angular range of 3600° can thus be detected in such a way that unambiguous associations are possible for the rotational angles $\psi$ and $\theta$ of the gear wheels 3 and 4. For calculating the absolute rotational angle $\phi$ within the angular range, in this case of 3600°, a value k can thus initially be determined as follows:

$$k = \frac{(m+1)*\theta - m*\psi}{\Omega}. \quad (1)$$

The angles $\psi$ and $\theta$ have already been measured beforehand using the sensors 5 and 6. The rotational angle $\phi$ can accordingly be determined with the following equation:

$$\varphi = \frac{m*\psi + (m+1)*\theta - (2m+1)*k*\Omega}{2n}. \quad (2)$$

Figure 2:
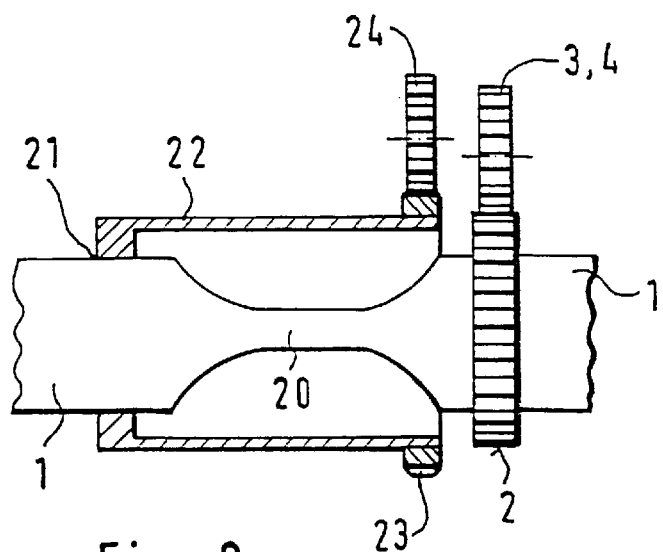
FIG. 2, a sectional view of a sensor arrangement according to the invention, with a torsion bar, for detecting the angular position and the torque acting on the shaft.

From FIG. 2, an exemplary embodiment according to the invention is shown of a sensor arrangement on the shaft 1, such as the steering spindle of a motor vehicle, in which over the course of the shaft 1 a torsion bar 20 is formed to measure torque. The set of teeth 2 already shown in FIG. 1 is mounted here on the first angle encoder on the shaft 1. Gear wheels 3 and 4 mesh with the set of teeth 2 in a manner analogous to what is shown in FIG. 1. From a different fastening point 21, a sleeve 22 protrudes back to the first fastening point in order to form the second angle encoder, and on its free end it has a set of teeth 23, which has the same number of teeth n as the set of teeth 2.

Meshing with the set of teeth 23 is a gear wheel 24, which has an identical number of teeth m or m+1 to the gear wheel 3 or 4 and is likewise equipped with a magnet, not visible here, and a corresponding sensor. If a torque now acts on the torsion bar 20, then the sets of teeth 2 and 23 rotate counter to one another, thus resulting in a different rotation of the gear wheel 24 in proportion to the gear wheel 3 or 4 that has the same number of teeth. From the change in angle between the gear wheel 24 and the gear wheel 3 or 4, the incident torque can now be calculated, in the same way as how the absolute value of the rotational angle $\phi$ was determined as described above.

The determination of a value k1 is done in the same way as the calculation of the value k by equation (1), from the angular positions of the gear wheels 3 and 4. If no torque is being exerted on the shaft 1, then a calculation of a value k2 by the method described, on the basis of the rotational angle of the gear wheel 24 rather than of the identically embodied gear wheel 3 or 4, again results in an unambiguous value that is always in the same proportion to the value k1. If a change in the ratio of k1 to k2 now occurs, then this is the result of a change in the angular difference between the gear wheel 24 and the gear wheel 3 or 4 having the same number of teeth. This change in the angular difference is the result of a torque acting on the shaft and can be converted in the evaluation circuit 9 into a corresponding output signal.

What is claimed is:

1. A sensor arrangement for detecting a parameter of mechanical components selected from the group consisting of an angle of rotation, a torque of rotating, and both, the sensor arrangement comprising first and second angle encoders securable mechanically at axially different points to a rotating component, at least one sensor disposed in a region of said angle encoders, said angle encoders and said at least one sensor being disposed such that a torsion of the rotating component is detected as a relative change in an angle between said angle encoders; a torsion bar located between securing points of said angle encoders; two bodies rotating in slaved fashion at different speeds of revolutions, said bodies being disposed on said first angle encoder on a circumference of the rotating component so that their rotational angles are detected with said sensor and from their rotational angle difference an absolute rotational angle position of the rotating component is determined, said second angle encoder being engaged with another end of said torsion bar; a further rotating body which engages a sleeve corresponding to said first angle encoder and corresponds to one of said first mentioned rotating bodies or the other of said first mentioned rotating bodies, so that a torque is derived from a rotating angle difference of said further rotating body of said second angle encoder and of said one and other first-mentioned rotating bodies of said first angle encoder.

2. A sensor arrangement as defined in claim 1, wherein said first angle encoder is provided with formations selected from the group consisting of angle markings and intermeshing sets of teeth of the circumference of the rotating component and of said first mentioned rotatable bodies, said second angle encoder being provided with further formations selected from the group consisting of angle markings and intermeshing sets of teeth provided on a circumference of said sleeve and of said further rotating body, so that a number of said mentioned formations on the rotating component and said sleeve agree, and a number of said formations of said further rotating body and on said first mentioned rotating bodies of said first angle encoder agree.

3. A sensor arrangement as defined in claim 2, wherein a number of said formations of said first mentioned rotating bodies of said first angle encoder differ (m+1) by one formation.

4. A sensor arrangement as defined in claim 1, wherein said sensors that detect an angular position of said rotating bodies are magnetoresistive sensors selected from the group consisting of a AMR sensors, CMR sensors, and GMR sensors, which output a signal that is dependent substantially on a field line direction of magnets connected to said rotating bodies; and further comprising an evaluation circuit in which from said signals the absolute rotational angle of the rotating component and the torque acting on the rotating component are ascertained.

5. A sensor arrangement as defined in claim 4, wherein said evaluation circuit is a hybrid circuit which includes the magnetoresistive sensors and a computation circuit for evaluation of measured angles.

6. A sensor arrangement as defined in claim 1, wherein the sensor arrangement is an arrangement for detecting a parameter of a rotating mechanical component which is a steering spindle of a motor vehicle, on which spindle said angle encoders are mounted.

7. A method for detection a parameter of a rotating mechanical component selected from the group consisting of a rotational angle, a torque, and both, with the use of the sensor arrangement defined in claim 1, the method comprising the steps of ascertaining for each position of the rotating component a first value by evaluating rotational angles of the rotatable bodies of the first angle encoder; ascertaining a second value by evaluating a rotational angle of the further rotatable body on the second angle encoder; and monitoring a ratio of the values so that if there is a change in a ratio and in an angular difference between the further rotatable body on the second angular encoder and one of the first two rotatable bodies on the first angle encoder, or between the further rotatable body on the second angle encoder and the other of the first two rotatable bodies on the first angle encoder, a torque is detected.

* * * * *